(12) United States Patent
Nakajima

(10) Patent No.: US 9,591,253 B2
(45) Date of Patent: Mar. 7, 2017

(54) IMAGING APPARATUS AND METHOD FOR CONTROLLING IMAGING APPARATUS

(71) Applicant: CANON KABUSHIKI KAISHA, Tokyo (JP)

(72) Inventor: Michinori Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 14/303,298

(22) Filed: Jun. 12, 2014

(65) Prior Publication Data
US 2014/0369665 A1 Dec. 18, 2014

(30) Foreign Application Priority Data
Jun. 14, 2013 (JP) .................................. 2013-125725

(51) Int. Cl.
| G11B 27/00 | (2006.01) |
| H04N 5/93 | (2006.01) |
| H04N 5/935 | (2006.01) |
| H04N 9/80 | (2006.01) |
| H04N 5/77 | (2006.01) |
| G11B 27/031 | (2006.01) |
| G11B 27/10 | (2006.01) |
| H04N 5/232 | (2006.01) |

(52) U.S. Cl.
CPC ............ *H04N 5/772* (2013.01); *G11B 27/031* (2013.01); *G11B 27/105* (2013.01); *H04N 5/23222* (2013.01); *H04N 5/23293* (2013.01)

(58) Field of Classification Search
USPC ................. 386/223–224, 239–248, 278–290
See application file for complete search history.

(56) References Cited

U.S. PATENT DOCUMENTS

| 5,442,744 A * | 8/1995 | Piech | ................ G06F 17/30017 |
| | | | 707/E17.009 |
| 2004/0071441 A1* | 4/2004 | Foreman | ............... G06F 3/0483 |
| | | | 386/282 |

FOREIGN PATENT DOCUMENTS

JP 2006-074406 A 3/2006

* cited by examiner

*Primary Examiner* — Hung Dang
(74) *Attorney, Agent, or Firm* — Canon USA, Inc. I.P. Division

(57) ABSTRACT

An imaging apparatus is controlled in such a manner that, to perform a scenario shooting, a list of the scenes forming the scenario is displayed, and when the scene selected in the list is a captured scene, the selected captured scene is played back, and when the selected scene is an uncaptured scene, the imaging apparatus enters a shooting standby state for capturing the selected uncaptured scene.

21 Claims, 11 Drawing Sheets

FIG. 3

| TITLE | SCENE NO. | SCENE RELATED INFORMATION (SUCH AS SCENE NAME) | IMAGE NO. |
|---|---|---|---|
| BIRTHDAY PARTY | 1 | ENTRY OF BIRTHDAY BOY/GIRL | 3 |
| | 2 | RECEIVING BIRTHDAY PRESENT | 2 |
| | 3 | CANDLE BLOWING | - |
| | 4 | TAKING BIRTHDAY PHOTO | 1 |
| | 5 | PLAYING GAME ALL TOGETHER | - |

301 302 303 304

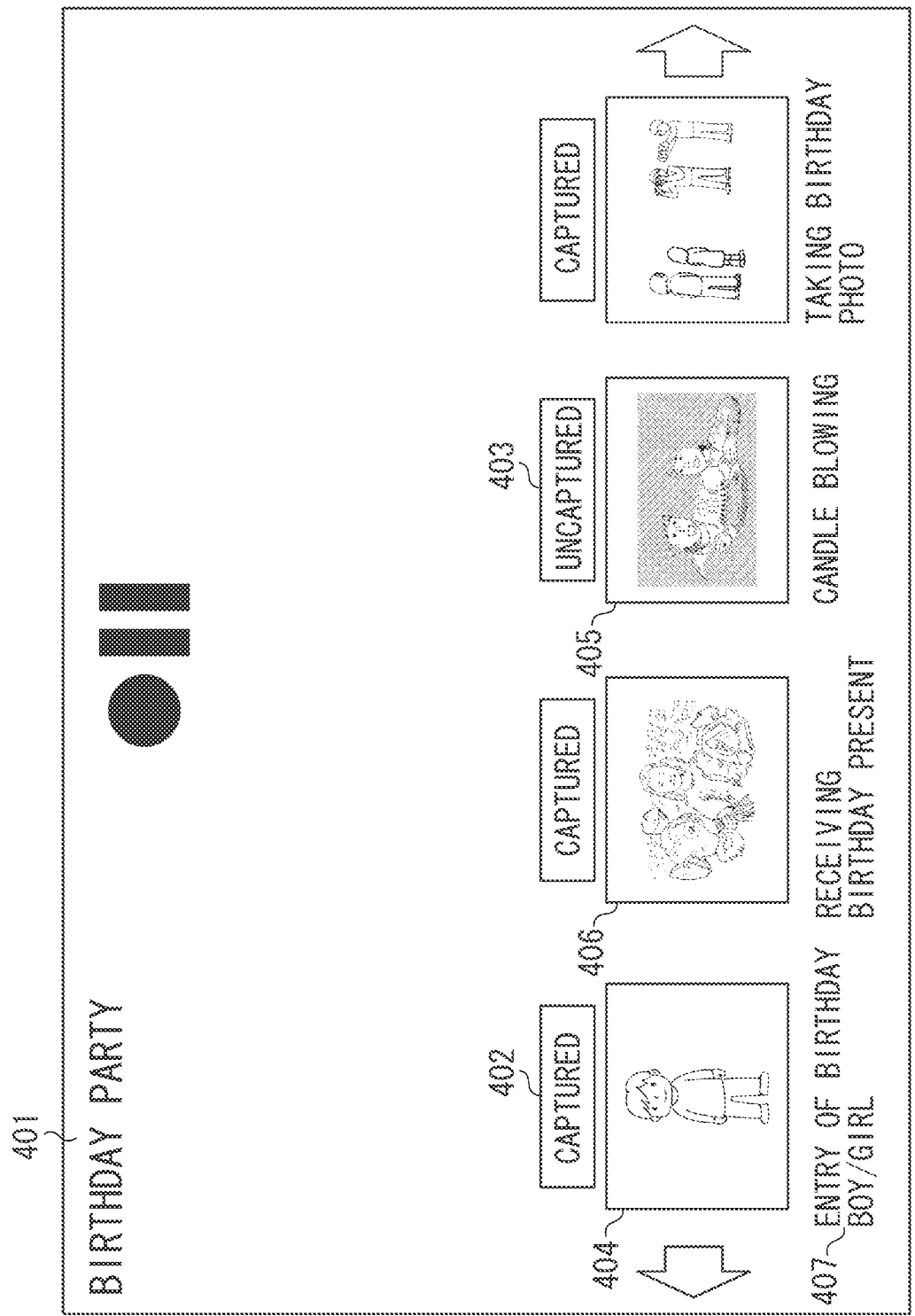

BIRTHDAY PARTY

408 CANDLE BLOWING

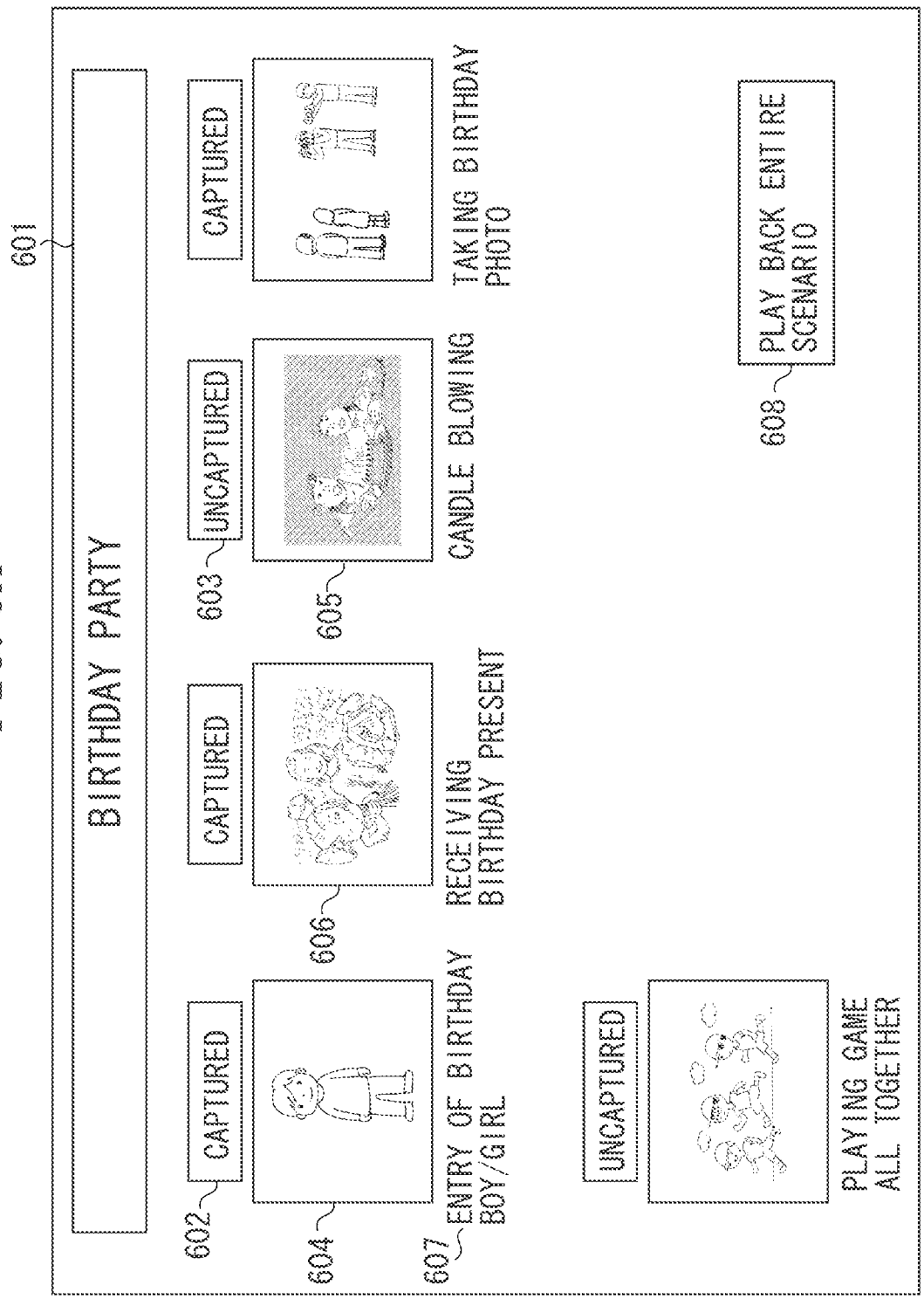

BIRTHDAY PARTY

608 CANDLE BLOWING

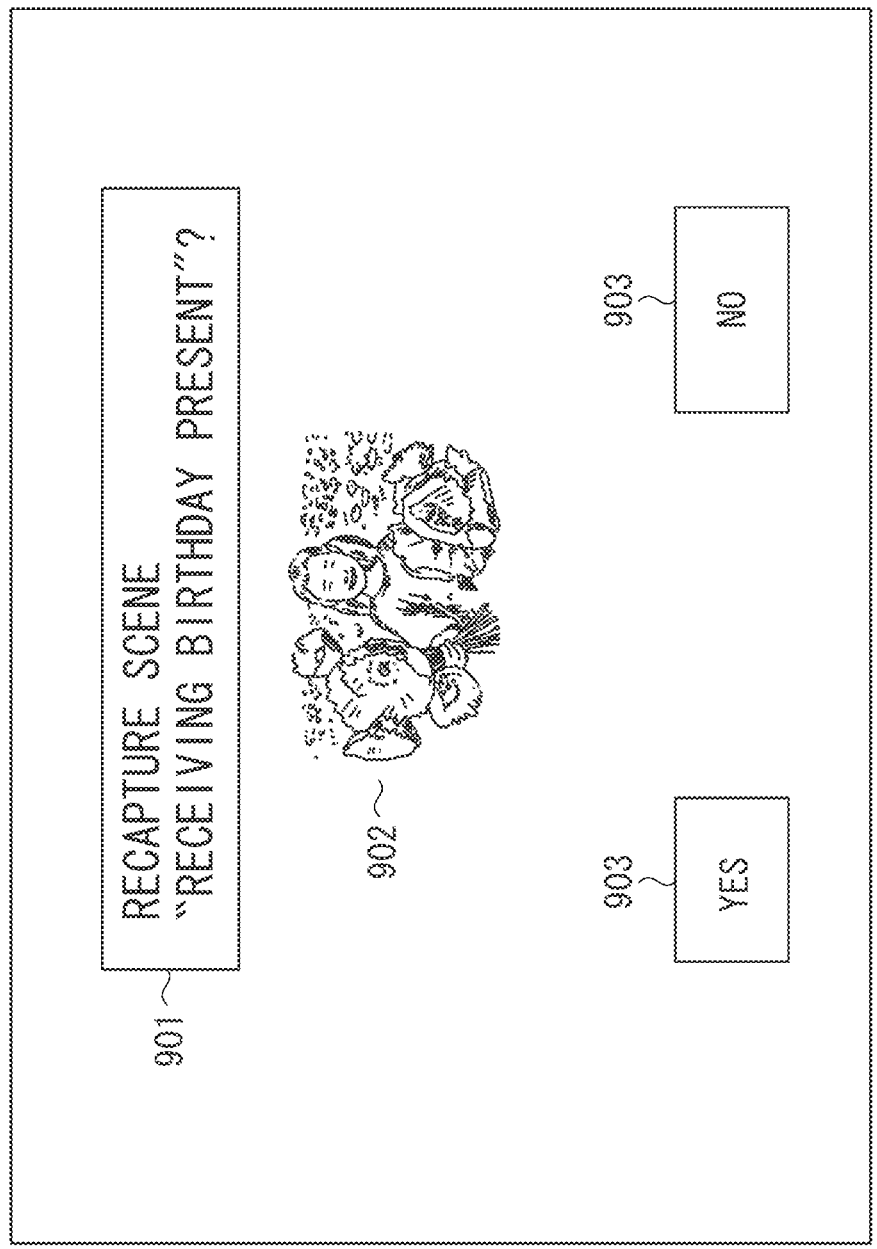

ed in and constitute a part of the specification, illustrate exem-
IMAGING APPARATUS AND METHOD FOR CONTROLLING IMAGING APPARATUS

BACKGROUND

Field of the Disclosure

Aspects of the present invention generally relate to an imaging apparatus for capturing moving images and to a method for controlling the imaging apparatus.

Description of the Related Art

In recent years, digital video cameras, digital still cameras with a moving image capturing function, and mobile phones with the moving image capturing function have been in widespread use, and now anyone can easily record moving images. However, randomly capturing moving images cannot provide a high quality video work. Thus, to create a high quality video work, it is important to capture moving images along a story line according to a plan to some extent. However, such a planned image capturing requires a substantial amount of technique, and thus is not something that anyone can easily perform.

For example, Japanese Patent Application Laid-Open No. 2006-074406 discusses a function to assist the image capturing. Specifically, scenario information, and scene shooting information added to a plurality of scenes constituting a scenario are displayed on a display unit. In a case where a plurality of scenes are connected to create a video work with a story line, and when one of the scenes is to be captured, it should be advantageous for the user to be aware of images of the scenes prior and subsequent to the scene to be captured, so that the scene can be captured taking the connection between the scenes into account. However, conventionally, to check the scenes prior and subsequent to the scene to be captured, the user has to first put the apparatus into a playback mode to check the prior and subsequent scenes, and then put the apparatus back to a shooting mode. Thus, the operation for checking the prior and subsequent scenes is very cumbersome. Due to the slow response in switching the mode from the shooting mode to the playback mode, the transition from checking the scenes to performing the shooting operation takes time.

Further, the operation for checking which of the scenes in a scenario is uncaptured, and checking the captured scenes prior and subsequent to the uncaptured scene for capturing the uncaptured scene is very cumbersome.

An aspect of the present invention is to solve all or at least one of the problems described above.

SUMMARY OF THE INVENTION

According to an aspect of the present invention, an imaging apparatus for capturing a moving image includes a storage unit configured to store scenario data for forming one scenario with a plurality of scenes and for managing, in association with one of the plurality of scenes in the scenario, a moving image captured by an imaging unit, a display control unit configured to perform control so that a list of pieces of information representing the plurality of scenes is displayed on a display unit by using the scenario data, a selection unit configured to select one of the plurality of scenes from the list displayed on the display unit, and a control unit configured to perform control so that when the scene selected by the selection unit is a captured scene, the selected captured scene is played back, and when the scene selected by the selection unit is an uncaptured scene, the imaging apparatus enters a shooting standby state for capturing the selected uncaptured scene.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates scenario data according to the first exemplary embodiment.

FIGS. 4A and 4B each illustrate a user interface according to the first exemplary embodiment.

FIGS. 6A and 6B each illustrate a user interface according to the second exemplary embodiment.

FIG. 9 is a user interface according to the third exemplary embodiment.

DESCRIPTION OF THE EMBODIMENTS

Various exemplary embodiments, features, and aspects of the invention will be described in detail below with reference to the drawings.

Figure 1:
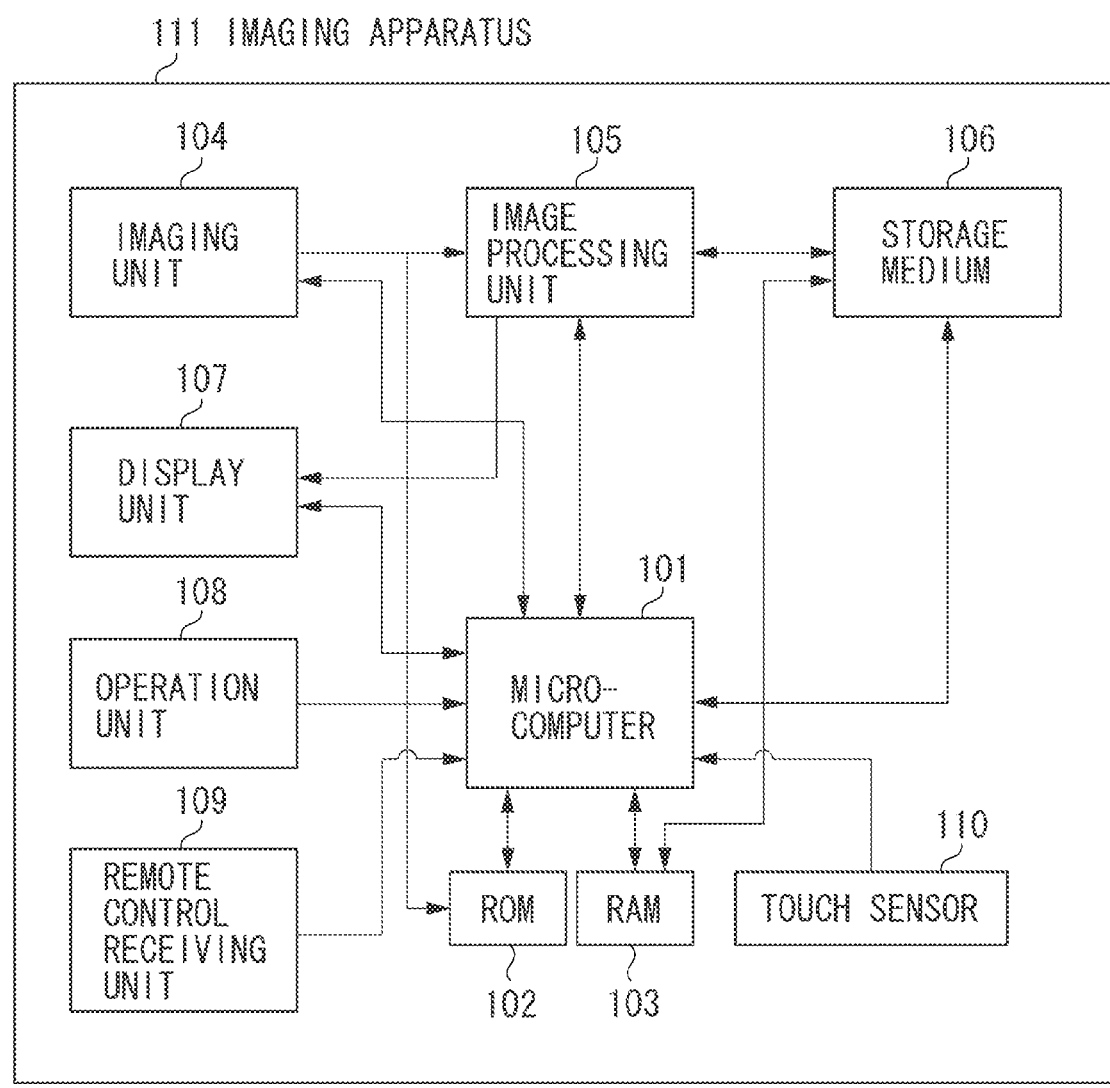
FIG. 1 is a block diagram illustrating a main portion of an imaging apparatus for realizing an exemplary embodiment.

FIG. 1 is a block diagram illustrating an example of an inner configuration of an imaging apparatus according to a first exemplary embodiment.

In FIG. 1, an imaging apparatus 111 includes a microcomputer 101, a read only memory (ROM) 102, a random access memory (RAM) 103, an imaging unit 104, an image processing unit 105, a storage medium 106, a display unit 107, an operation unit 108, a remote control receiving unit 109, and a touch sensor 110.

The microcomputer 101 reads and executes a program stored in the ROM 102 to control the entire system of the imaging apparatus 111. The microcomputer 101 is also in charge of display control for controlling a content displayed on the display unit 107. The ROM 102 and the RAM 103 have an area for storing various programs and data such as images. The ROM 102 is a non-volatile memory, and the RAM 103 is a volatile memory. The ROM 102 stores a program for the microcomputer 101 to operate, scenario data, and image data corresponding to a scene in a scenario. The RAM 103 is used as a work area for the microcomputer 101 to control the imaging apparatus 111. The RAM 103 stores various types of setting information indicating, for example, the settings of the imaging apparatus 111 and how the imaging apparatus 111 is operated. The setting information stored in the RAM 103 includes mode information and shooting mode information. The mode information indicates whether the imaging apparatus 111 is operating in a shooting mode or a playback mode. The shooting mode information indicates whether the imaging apparatus 111 is operating in a normal shooting mode or a scenario shooting mode.

The imaging unit 104 includes an image sensor, a lens, and a diaphragm mechanism. The imaging unit 104 converts an image of an object into a data signal, generates image data in response to an instruction from the microcomputer 101, and outputs the generated image data to the image processing unit 105. The image processing unit 105 performs resizing, luminance correction, and compression processing on the image data generated by the imaging unit 104, and outputs the resultant image data to the storage medium 106. The image processing unit 105 also decodes compressed image data input from the storage medium 106. The storage medium 106 stores the image data obtained by the image processing unit 105. The storage unit 106 also outputs the compressed image data stored therein to the image processing unit 105. The storage medium 106 includes, for example, a memory card such as a secure digital (SD) card (registered trademark), a Flash memory, and a hard disk. The display unit 107 includes a liquid crystal display. Image data captured by the imaging unit 104 and icons are displayed on the display unit 107. The operation unit 108 outputs a signal for instructing the imaging unit 104 to capture an image and a signal for turning on and off the power source, to the microcomputer 101. The remote control receiving unit 109 receives a remote control operation signal from a user, and outputs the signal to the microcomputer 101. The touch sensor 110 outputs coordinates touched by the user, to the microcomputer 101. The microcomputer 101 determines, based on the coordinates, which of the icons displayed on the display unit 107 is touched by the user, and then issues a state transition instruction for the imaging apparatus 111 or changes a shooting parameter. For example, in a digital video camera, the state transition instruction is for instructing the transition from the playback mode to the shooting mode. In the playback mode, the image data is read from the storage medium 106. In the shooting mode, the image data is written to the storage medium 106. Changing the shooting parameter means changing a shooting condition in the shooting mode. For example, a bit rate of a moving image file is changed, the resolution is changed, and the operation mode in the shooting mode is switched among a portrait mode, a scenery mode, a sports mode, and a scenario mode.

Figure 2:
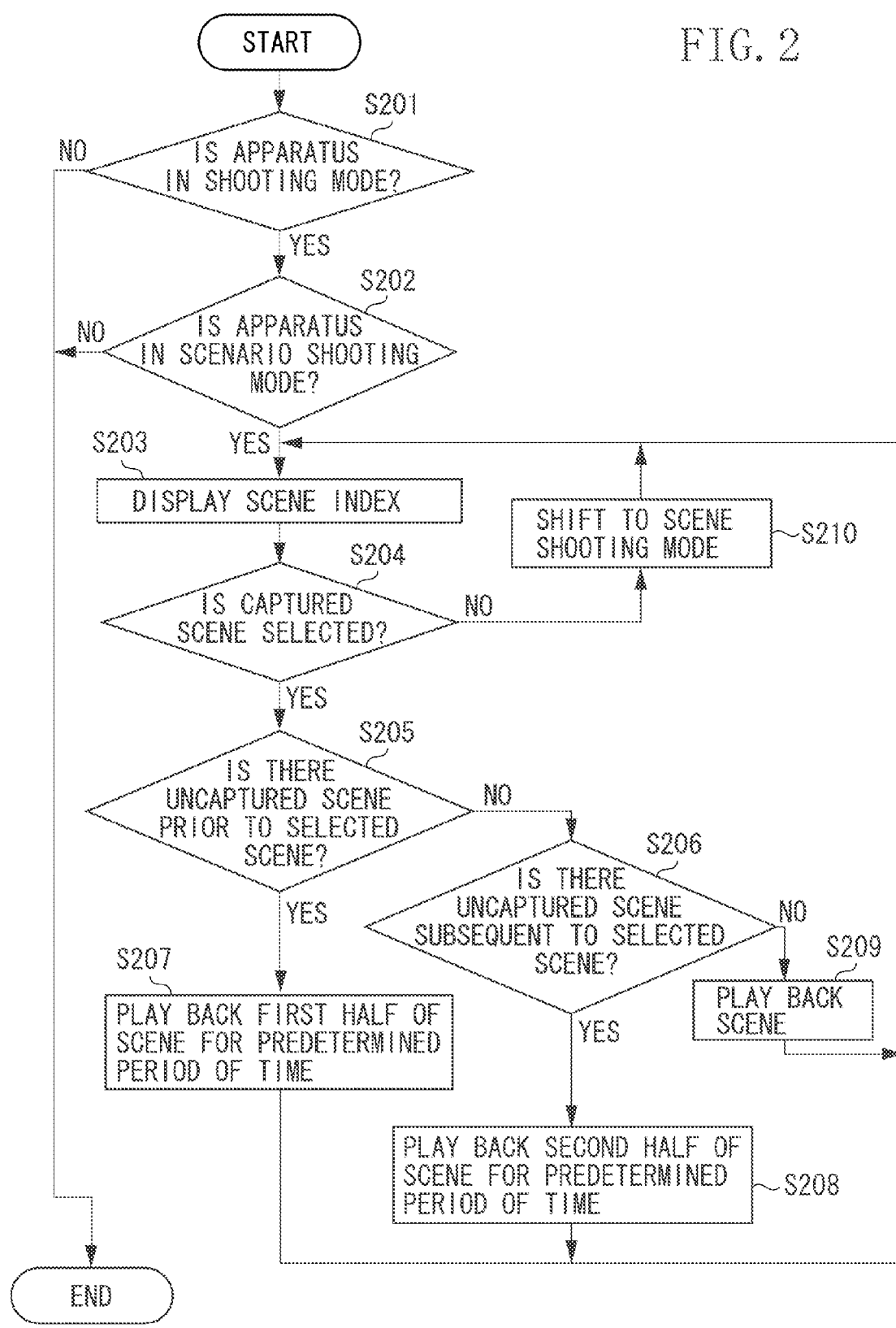
FIG. 2 is a flowchart according to a first exemplary embodiment.

Next, a series of processing from the scenario shooting mode to the playback/recording of a selected scene to be performed by the imaging apparatus 111 will be described by referring to FIG. 2.

In step S201, the microcomputer 101 determines whether the imaging apparatus 111 is operating in the shooting mode or the playback mode, based on information stored in the RAM 103. The processing proceeds to step S202 when the imaging apparatus 111 is operating in the shooting mode (YES in step S201). The processing ends when the imaging apparatus 111 is operating in the playback mode (NO in step S201).

In step S202, the microcomputer 101 determines whether the imaging apparatus 111 is operating in the scenario shooting mode or the other shooting mode, based on the information stored in the RAM 103. The processing proceeds to step S203 when the imaging apparatus 111 is operating in the scenario shooting mode (YES in step S202). The processing ends when the imaging apparatus 111 is operating in the normal shooting mode (NO in step S202).

In the scenario shooting mode, captured moving image data, and scene information of scenario data are recorded while being associated with each other.

An example of the scenario data is illustrated in FIG. 3. One scenario includes a plurality of scenes, and is managed as scenario data in such a manner that the scenes are sequentially played back in the order defined in the scenario to be a single video work. Such scenario data includes the following elements: a title 301, a scene number 302, scene related information (such as a name of a scene and shooting guidance) 303, and an image number 304. With the scenario data, when scenes of a birthday party are to be captured for example, creating a video work with a story line can be expected by capturing a plurality of representative scenes according to the scene related information (such as the name of the scene and the shooting guidance) 303, and sequentially playing back the captured scenes. For example, with the scenario data illustrated in FIG. 3, creating a high quality video work with a story line can be expected by capturing the scenes "entry of birthday boy/girl", "receiving birthday present", "candle blowing", "taking birthday photo", and "playing game all together".

Using such scenario data to capture the birthday party scenes according to the configuration of the scene related information 303 is referred to as the scenario shooting mode. The image number 304 is an area for storing information indicating which of the images corresponds to each piece of the scene related information 303, or that an image is uncaptured. The scene related information 303 may be the title of each of the scenes, the description of each of the scenes, the guidance on the imaging method, or the description of the shooting condition.

In FIG. 3, the third image corresponds to the scene "entry of birthday boy/girl", the second image corresponds to the scene "receiving birthday present", an image is uncaptured for the scene "candle blowing", the first image corresponds to the scene "taking birthday photo", and an image is uncaptured for the scene "playing game all together". For example, in the case of advanced video coding high definition (AVCHD), the image number 304 may be a shot number in a real play list or the number in a MTS file name (XXXX in XXXX.mts). This information is stored in the storage medium 106 together with an image. When an image is captured in the scenario shooting mode, the scenario data is stored in the storage medium 106 while being associated with the image. The microcomputer 101 controls the storage medium 106 to load the scenario data into the RAM 103, at the time of mounting. When the scene "candle blowing" is captured as the fourth image, the microcomputer 101 changes the image number 304 of the scene "candle blowing" in the scenario data loaded into the RAM 103 from "-" to "4". Then, the microcomputer 101 controls the storage medium 106 to update the scenario data loaded into the RAM 103. The normal shooting mode is a shooting mode without scenario data, and thus is a shooting mode in which the editing of the scenario data described above is not performed.

In step S203, for the captured scene in the corresponding scenario data, the microcomputer 101 controls the storage medium 106 to output a part of the captured scene stored in the storage medium 106 to the image processing unit 105. Then, the microcomputer 101 controls the image processing unit 105 to display a representative image (a thumbnail obtained by reducing the size of a head frame, for example) corresponding to the captured scene, on the display unit 107. For the uncaptured scene, the microcomputer 101 controls the ROM 102 to output the image data of the corresponding scene in the scenario to the image processing unit 105. Then, the microcomputer 101 controls the image processing unit 105 to display the image data of the uncaptured scene on the display unit 107. The image corresponding to the uncaptured scene may be an illustration, a photograph, or character information, stored in advance.

An example of a screen displayed on the display unit 107 is illustrated in FIG. 4A. Here, the imaging apparatus 111 is in the shooting mode, and a live image currently being output from the imaging unit 104 is displayed as the background. Related pieces of information corresponding to a plurality of scenes constituting a scenario is displayed as a list.

As illustrated in 402 and 403, the scenes "entry of birthday boy/girl", "receiving birthday present", and "taking birthday photo" have already been captured, and the scene "candle blowing" has not yet been captured. As illustrated in 401, the title of a video work to be created is displayed in an upper portion of the screen. As illustrated in 404 and 406, for the captured scenes, the representative images corresponding to the captured scenes are displayed. The representative scene may be a thumbnail image recorded while being associated with the image data, or an image generated by extracting a part of the image data (e.g., a head frame or an image captured five seconds after start of shooting).

As illustrated in 405, for the uncaptured scene, image data (which may be an illustration or a character image) corresponding to the corresponding scene in the scenario is displayed. As illustrated in 402 and 403, information, with which whether the relevant scene has been captured or uncaptured is identifiable, is displayed above the displayed representative image or image data. As illustrated in 407, the scene related information 303 is displayed below the representative image or the image data. The user touches the touch sensor 110 while viewing the display unit 107. The touch sensor 110 outputs information indicating which area is touched, to the microcomputer 101. Based on the output information, the microcomputer 101 compares the displayed area on the display unit 107 with the touched area on the touch sensor 110, to determine which scene is selected. For example, the microcomputer 101 determines that the scene "entry of birthday boy/girl" is selected when 404 is touched. The microcomputer 101 determines that the scene "receiving birthday present" is selected when 406 is touched. The scene may be selected by a remote control operation through the remote control receiving unit 109. In this case, the remote control receiving unit 109 receives a remote control code from a remote controller, and outputs remote control information to the microcomputer 101. The microcomputer 101 determines which scene is selected, based on the remote control code input from the remote control receiving unit 109. Then, the processing proceeds to step S204.

In step S204, the microcomputer 101 determines whether the user has selected a captured scene or an uncaptured scene in step S203. The processing proceeds to step S205 when a captured scene is selected (YES in step S204), and proceeds to step S210 when an uncaptured scene is selected (NO in step S204).

In step S205, the microcomputer 101 determines whether there is an uncaptured scene prior to the scene selected in step S203. The processing proceeds to step S207 when there is an uncaptured scene prior to the scene (YES in step S205). The processing proceeds to step S206 when there is no uncaptured scene prior to the scene (NO in step S206). The determination on whether there is an uncaptured scene prior to the scene will be described below referring to FIGS. 3 and 4A. As illustrated in 303, the video work titled "birthday party" includes a total of five scenes, "entry of birthday boy/girl", "receiving birthday present", "candle blowing", "taking birthday photo", and "playing game all together". When the user selects the scene "taking birthday photo" in step S203 in a state where three of the scenes, "entry of birthday boy/girl", "receiving birthday present", and "taking birthday photo" have already been stored in the storage medium 106, the microcomputer 101 determines that the scene "candle blowing" prior to the scene "taking birthday photo" is uncaptured and therefore there is an uncaptured scene prior to the selected scene. When any of the other scenes is selected, the microcomputer 101 determines that there is no uncaptured scene prior to the selected scene.

In step S206, the microcomputer 101 determines whether there is an uncaptured scene subsequent to the scene selected in step S203. The processing proceeds to step S208 when there is an uncaptured scene subsequent to the scene (YES in step S206). The processing proceeds to step S209 when there is no uncaptured scene subsequent to the scene (NO in step S206). The determination on whether there is an uncaptured scene subsequent to the scene will be described below referring to FIGS. 3 and 4A. When the user selects the scene "receiving birthday present" in step S203, based on the scenario data loaded into the RAM 103, since the scene "candle blowing" subsequent to the scene "receiving birthday present" is uncaptured, the microcomputer 101 determines that there is an uncaptured scene subsequent to the selected scene. When the user selects the scene "taking birthday photo", since the subsequent scene "playing game all together" is uncaptured, the microcomputer 101 also determines that there is an uncaptured scene subsequent to the selected scene. When the scene other than those is selected, the microcomputer 101 determines that there is no uncaptured scene subsequent to the selected scene.

In step S207, the microcomputer 101 determines which scene to be played back, based on the scenario data stored in the RAM 103. Then, the microcomputer 101 controls the storage medium 106 to output the image data of a predetermined time period in a top portion of the determined scene, to the image processing unit 105. The predetermined time period may be a time period stored in the RAM 102. Alternatively, the microcomputer 101 may control the image processing unit 105 to display a user interface (UI) for the user to select the number of seconds during which the image is played back, on the display unit 107, and play back the image for the seconds corresponding to the value input by the user. Here, the head frame is not necessarily displayed. However, the above processing enables the user to recognize the image around the top of the scene. This can help, when capturing the scene prior to the played back scene, to capture the scene while taking into account the connection to the subsequent scene. Then, the image processing unit 105 decodes the input image data and displays the decoded image data on the display unit 107 for a predetermined time period. Then, the processing proceeds to step S203.

In step S208, the microcomputer 101 determines which scene to be played back, based on the scenario data stored in the RAM 103. Then, the microcomputer 101 controls the storage medium 106 to output the image data of a predetermined period of time in an end portion of the determined scene, to the image processing unit 105. Here, the last frame is not necessarily played back, and a part of the end portion may be played back. The image processing unit 105 decodes the input image data, and displays the decoded image data on the display unit 107. Then, the processing proceeds to step S203. The above processing enables the user to recognize the image around the end of the scene. This can help, when capturing the scene subsequent to the played back scene, to capture the scene while taking into account the connection to the prior scene.

In step S209, the microcomputer 101 determines which scene to be played back, based on the scenario data stored in the RAM 103. Then, the microcomputer 101 controls the storage medium 106 to output the entire image data of the determined scene to the image processing unit 105. The image processing unit 105 decodes the input image data, and displays the decoded image data on the display unit 107. Then, the processing proceeds to step S203.

Figure 4B:
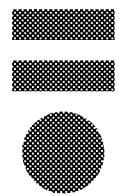
Figure 4B:
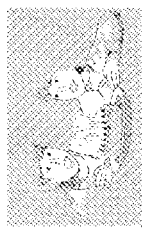

In step S210, the microcomputer 101 shifts the mode to the scenario shooting mode for the scene selected in step S203. For example, if the scene selected in step S203 is the scene "candle blowing", the microcomputer 101 controls the image processing unit 105 to display the UI as illustrated in FIG. 4B on the display unit 107, and then enters the shooting mode, in which the scene "candle blowing" and the image to be captured are associated with each other. How the moving image data thus obtained is associated with a scene in a scenario has been described in step S202. Here, which scene to be captured is displayed in the lower portion of the screen as illustrated in 408. Then, the processing proceeds to step S203.

A second exemplary embodiment will be described below.

Figure 5:
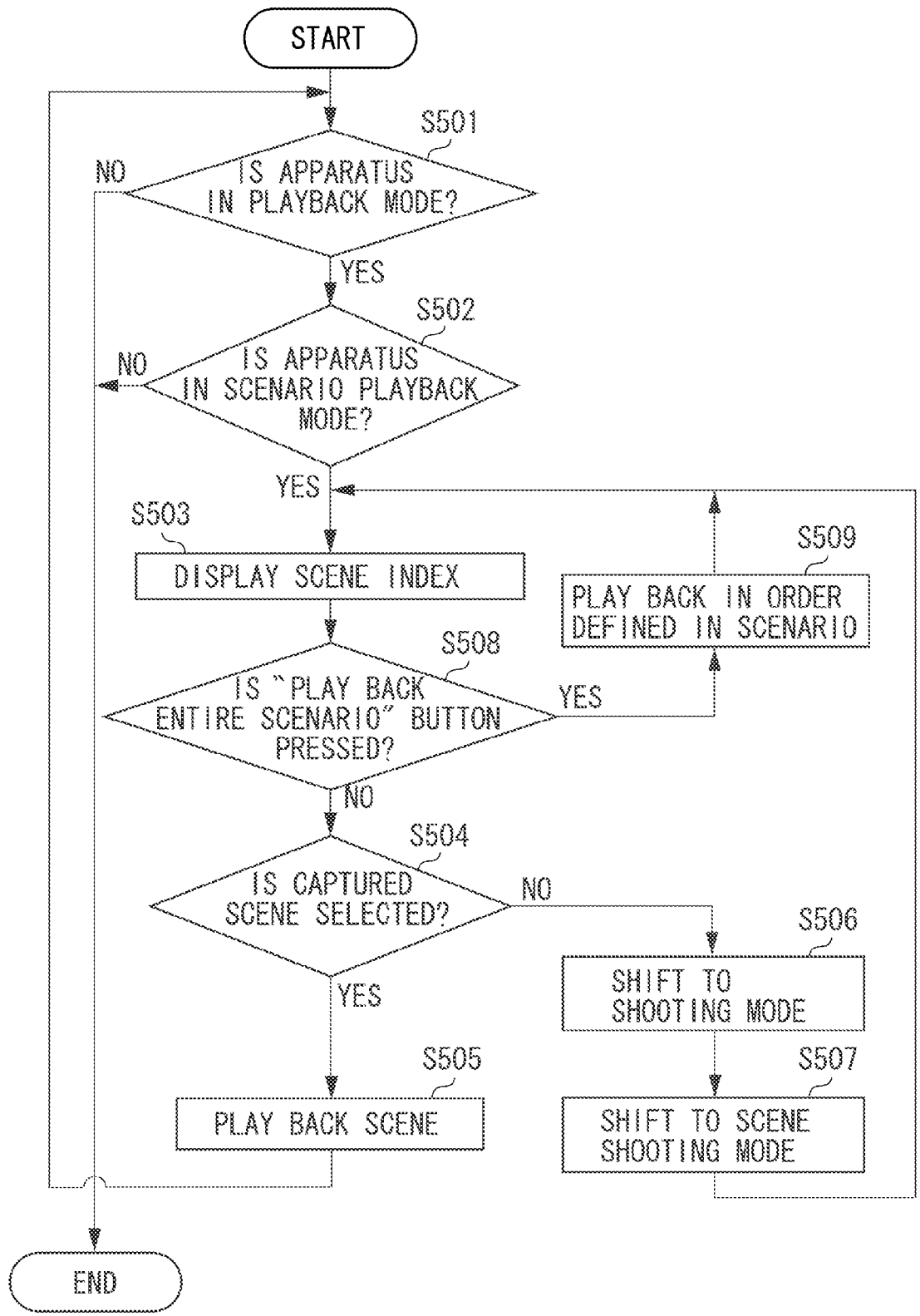
FIG. 5 is a flowchart according to a second exemplary embodiment.

Next, a series of processing from the state of the scene index being displayed to the playback and recording of a selected scene when the imaging apparatus 111 is in the scenario playback mode will be described referring to the flowchart of FIG. 5.

In step S501, the microcomputer 101 determines whether the imaging apparatus 111 is operating in the shooting mode or the playback mode, based on information stored in the RAM 103. The processing proceeds to step S502 when the imaging apparatus 111 is operating in the playback mode (YES in step S501). The processing ends when the imaging apparatus 111 is operating in the shooting mode (NO in step S501).

In step S502, the microcomputer 101 determines whether the imaging apparatus 111 is operating in the scenario playback mode or the other playback mode, based on the information stored in the RAM 103.

The user can switch between the scenario playback mode and the other playback mode with an unillustrated menu. The information indicating the selected playback mode is stored in the RAM 103, and the microcomputer 101 makes the determination based on the information.

When the imaging apparatus 111 is operating in the scenario playback mode (YES in step S502), the microcomputer 101 controls the storage medium 106 to load the scenario data into the RAM 103. Then, the microcomputer 101 analyzes the scenario data loaded into the RAM 103 to create a correspondence table of the scene number 302 and the image number 304, and the processing proceeds to step S508. The processing ends when the imaging apparatus 111 is operating in the other playback mode (NO in step S502).

In step S503, for the captured scene in the corresponding scenario data, the microcomputer 101 controls the storage medium 106 to output a part of the captured scene stored in the storage medium 106 to the image processing unit 105. Then, the microcomputer 101 controls the image processing unit 105 to display a representative image corresponding to the captured scene on the display unit 107. The representative image may be a thumbnail image recorded while being associated with the image data, or an image generated by extracting a part of the image data (e.g., a head frame) and performing reducing processing thereon.

For the uncaptured scene, the microcomputer 101 controls the ROM 102 to output the image data corresponding to the corresponding scene to the image processing unit 105. The image corresponding to the uncaptured scene may be an illustration, a photograph, or character information, stored in advance. Then, the microcomputer 101 controls the image processing unit 105 to display the image data of the uncaptured scene on the display unit 107.

An example of a screen displayed on the display unit 107 when the scenario data illustrated in FIG. 3 is stored in the storage medium 106 is illustrated in FIG. 6A.

As illustrated in 601, the title of a video work to be created is displayed in an upper portion of the screen, and a list of related pieces of information corresponding to a plurality of scenes is displayed on the screen. For example, as illustrated in 604, for the captured scene, the representative image of the captured image is displayed. As illustrated in 605, for the uncaptured scene, image data corresponding to the corresponding scene in the scenario is displayed. As illustrated in 602 and 603, information, with which whether the relevant scene has been captured or uncaptured is identifiable, is displayed above the displayed representative image or image data. As illustrated in 607, the scene related information 303 (such as the name of the scene and the shooting guidance) is displayed below the representative image or the image data.

The user touches the touch sensor 110 while viewing the display unit 107. The touch sensor 110 outputs information indicating which area is touched, to the microcomputer 101. Based on the output information, the microcomputer 101 compares the displayed area on the display unit 107 with the touched area on the touch sensor 110, to determine which scene is selected. Then, the processing proceeds to step S508.

For example, the microcomputer 101 determines that the scene "entry of birthday boy/girl" is selected, when 604 is touched. The microcomputer 101 determines that the scene "candle blowing" is selected, when 605 is touched. The scene may be selected by remote control operation through the remote control receiving unit 109. Here, the remote control receiving unit 109 receives a remote control code from a remote controller, and outputs remote control information to the microcomputer 101. The microcomputer 101 determines which scene is selected from the remote control code input from the remote control receiving unit 109.

In step S508, the microcomputer 101 determines whether the area touched by the user is a play back entire scenario button 608. When the user selects the play back entire scenario button 608 (YES in step S508), the captured scenes are played back in the order defined in the scenario with the uncaptured scene skipped. In the example of FIG. 3, the scenes "entry of birthday boy/girl", "receiving birthday present", and "taking birthday photo" are played back in this order, and thus the images numbers 3 to 1 are played back in this order.

On the other hand, in the other playback mode, the order defined in the scenario is irrelevant. For example, in the case of AVCHD format images, the scenes are played back in the shot order in the real play list. In the state illustrated in FIG. 3, "taking birthday photo", "receiving birthday present", and "entry of birthday boy/girl" are played back in this order.

In step S504, the microcomputer 101 determines whether the user has selected a captured scene or an uncaptured scene in step S503. The processing proceeds to step S505 when a captured scene is selected (YES in step S504), and proceeds to step S506 when an uncaptured scene is selected (YES in step S504).

In step S505, the microcomputer 101 determines which scene to start playing back, based on the scenario data stored in the RAM 103. Then, the microcomputer 101 controls the storage medium 106 to output the entire image data of the determined scene and then outputs the image data to be played back, to the image processing unit 105. The image processing unit 105 decodes the input image data, and outputs the decoded image data to the display unit 107. For example, when the scene "receiving birthday present" is selected in the scenario data illustrated in FIG. 3, the scene "receiving birthday present" is played back, and the processing returns to step S501.

In step S506, the microcomputer 101, the imaging unit 104, the image processing unit 105, and the storage medium 106 shift to a camera mode, and the imaging apparatus 111 shifts to the shooting mode. Then, the processing proceeds to step S507.

Figure 6B:
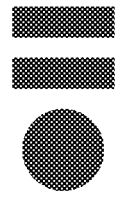
Figure 6B:

In step S507, the imaging apparatus 111 shifts to the scenario shooting mode for the scene selected in step S503. For example, when the scene "candle blowing" is selected in step S503, the microcomputer 101 controls the image processing unit 105 to display the UI as illustrated in FIG. 6B on the display unit 107, and the imaging apparatus 111 enters the shooting standby state. Here, when the shooting processing is performed and the shooting is completed, the obtained image data is associated with the scene number 302 of the scene "candle blowing". How the association is made is as described in step S202. Here, as illustrated in 608, the scene to be captured is displayed in a lower portion of the screen. When playing back the scene is completed, the processing proceeds to step S503.

As described above, the shift to capturing an uncaptured scene can be easily made from the UI which allows each scene of the scenario to be checked in the playback mode. Thus, it is very advantageous that the user can capture an uncaptured scene while recognizing the change point between the scenes and the atmosphere of the entire scenario.

In the first exemplary embodiment, a captured scene is played back for planning the configuration of the scene to be captured. However, the first exemplary embodiment does not enable a user to recapture the same scene as that captured in the camera mode after checking whether the scene has been captured as desired after the capturing.

Figure 7:
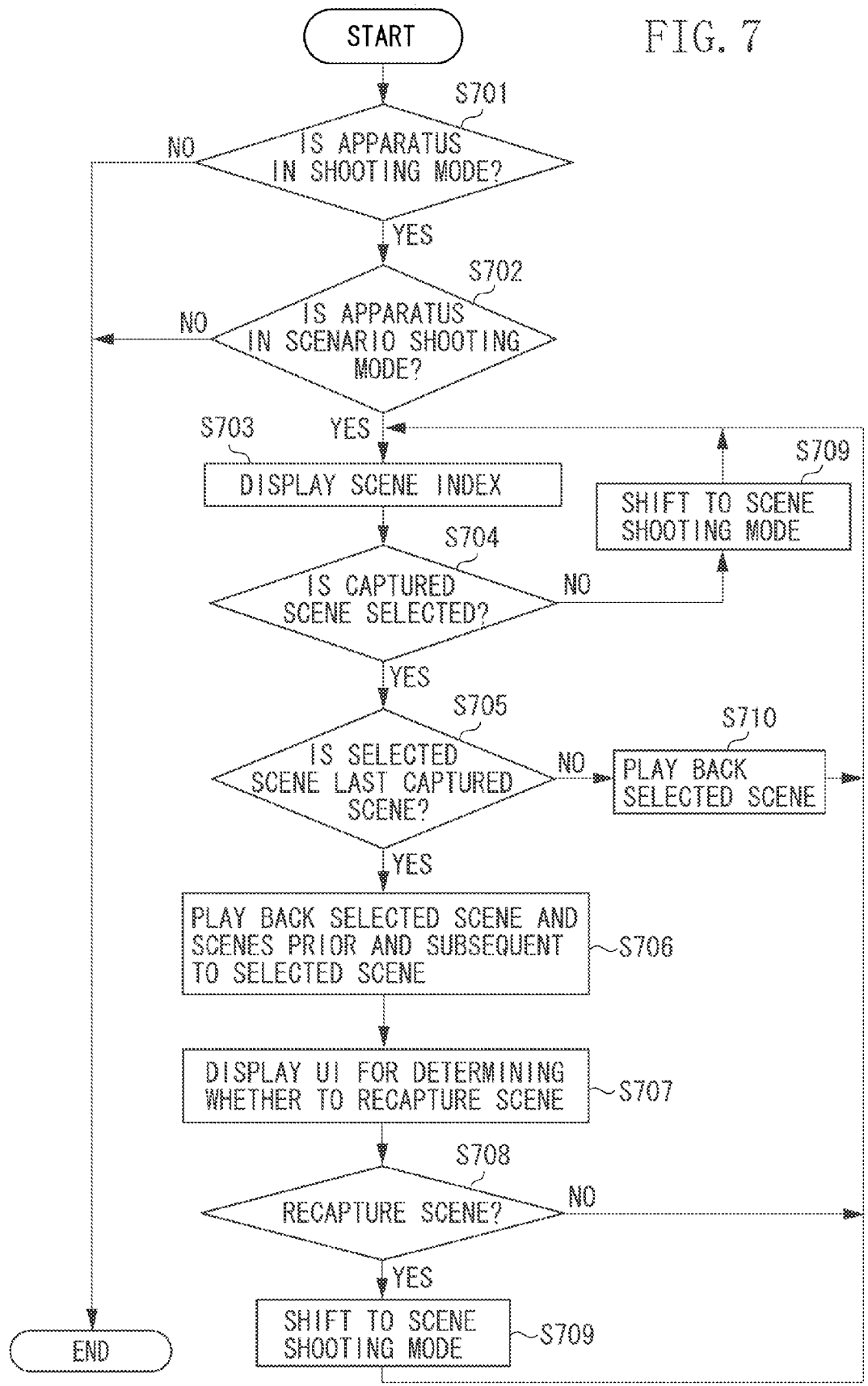
FIG. 7 is a flowchart according to a third exemplary embodiment.

Thus, in a third exemplary embodiment, a series of processing from the scenario shooting, the playback checking of a captured scene thereafter, to the recapturing the same scene to be performed by the imaging apparatus 111 will be described by using a flowchart in FIG. 7.

In step S701, the microcomputer 101 determines whether the imaging apparatus 111 is operating in the shooting mode or the playback mode, based on information stored in the RAM 103. The processing proceeds to step S702 when the imaging apparatus 111 is operating in the shooting mode (YES in step S701). The processing ends when the imaging apparatus 111 is operating in the playback mode (NO in step S701).

In step S702, the microcomputer 101 determines whether the imaging apparatus 111 is operating in the scenario shooting mode or the other shooting mode, based on the information stored in the RAM 103. The processing proceeds to step S703 when the imaging apparatus 111 is operating in the scenario shooting mode (YES in step S702). The flow related to this recapturing processing ends when the imaging apparatus 111 is operating in the other shooting mode (NO in step S702). This determination is similar to that described in step S202.

In step S703, for the captured scene in the corresponding scenario data, the microcomputer 101 controls the storage medium 106 to output a part of the captured scene stored in the storage medium 106 to the image processing unit 105. Then, the microcomputer 101 controls the image processing unit 105 to display the representative image corresponding to the captured scene on the display unit 107. For the uncaptured scene, the microcomputer 101 controls the ROM 102 to output the image data corresponding to the corresponding scene in the scenario to the image processing unit 105. Then, the microcomputer 101 controls the image processing unit 105 to display the image data (which may be an illustration or a character image) on the display unit 107. The displayed content and the processing are similar to those described in step S204. Then, the microcomputer 101 waits for the touch operation of the user, and the processing proceeds to step S704 when the microcomputer 101 determines that the touch operation is performed by the user.

In step S704, the microcomputer 101 determines whether the user has selected a captured scene or an uncaptured scene in step S703. The processing proceeds to step S705 when a captured scene is selected (YES in step S704). The processing proceeds to step S709 when an uncaptured scene is selected (NO in step S704).

In step S705, the microcomputer 101 controls the storage medium 106 to load moving image information into the RAM 103, and determines whether the scene selected in step S703 is the last captured scene. In the case of AVCHD for example, the moving image information is management information such as a real play list, and the last captured scene is the last scene in the real play list. In a moving image format without the management information, the last captured scene is the scene included in a moving image file with the latest update time.

Figure 8:
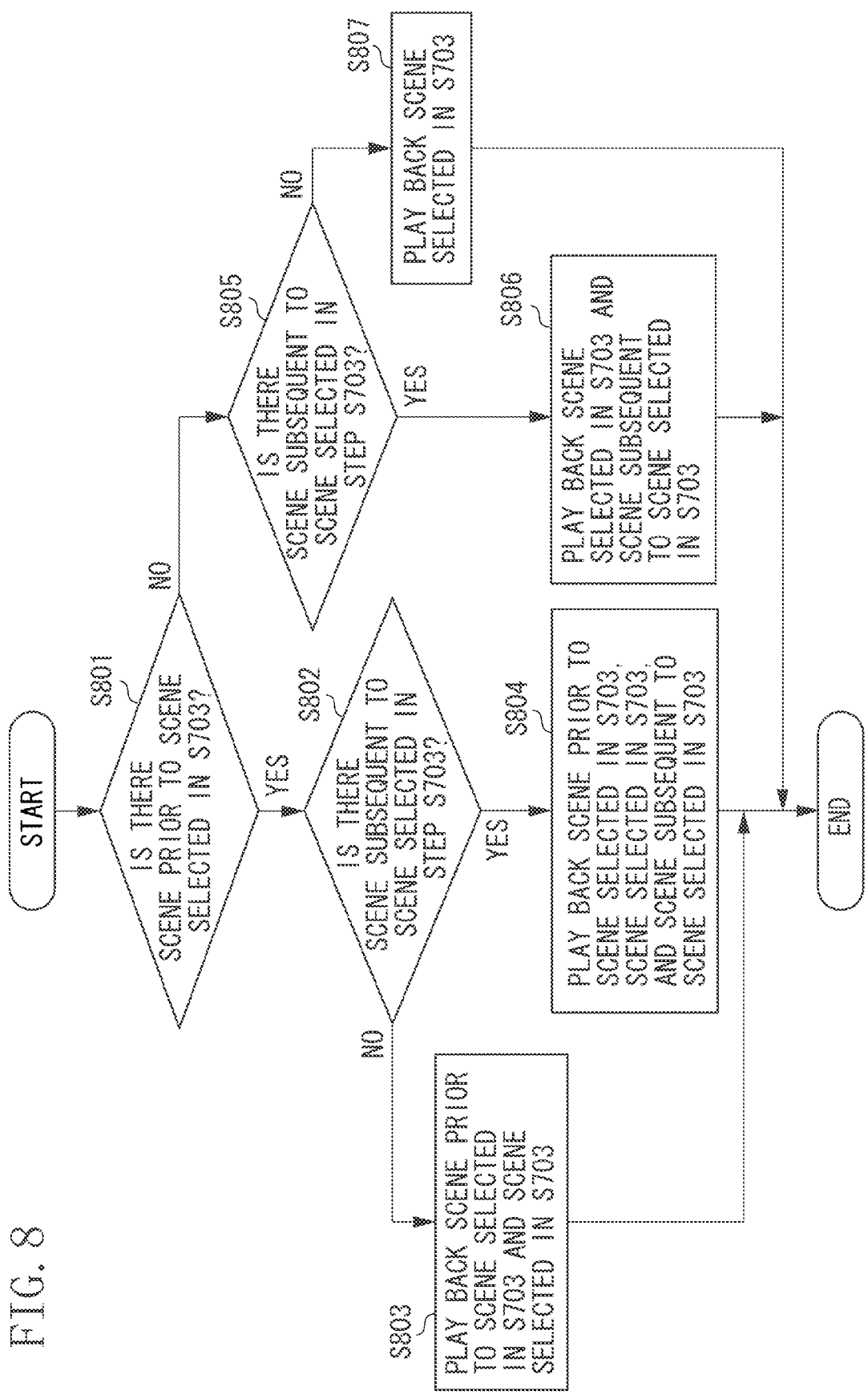
FIG. 8 is a flowchart according to the third exemplary embodiment.

In step S706, the microcomputer 101 plays back the scene selected in step S703 and the prior and subsequent scenes, based on the scenario data stored in the RAM 103, to be displayed on the display unit 107. The processing in step S706 will be described in detail with a flowchart in FIG. 8. Then, the processing proceeds to step S707.

In step S801, the microcomputer 101 determines whether there is a scene prior to the scene selected in step S703 based on the scenario data stored in the RAM 103. The processing proceeds to step S802 when there is a scene prior to the selected scene (YES in step S801), and proceeds to step S805 when there is no scene prior to the selected scene (NO in step S801).

In step S802, the microcomputer 101 determines whether there is a scene subsequent to the scene selected in step S703, based on the scenario data stored in the RAM 103. The processing proceeds to step S804 when there is a scene subsequent to the selected scene (YES in step S802). The processing proceeds to step S803 when there is no scene subsequent to the selected scene (NO in step S802).

In step S803, the microcomputer 101 controls the storage medium 106 to output the image data of the scene prior to the scene selected in step S703 and the image data of the scene selected in step S703, to the image processing unit 105. The image processing unit 105 decodes the input image data, and outputs the decoded image data to the display unit 107, to play back the moving image. Thus, the processing ends. The image data of the scene prior to the scene selected in step S703 to be output to the image processing unit 105 may be image data of a part of an end portion of the scene prior to the scene selected in step S703, or the entire image data of the scene prior to the scene selected in step S703.

In step S804, the microcomputer 101 controls the storage medium 106 to output the image data of the scene prior to the scene selected in step S703, the image data of the scene selected in step S703, and the image data of the scene subsequent to the scene selected in step S703, to the image processing unit 105. The image processing unit 105 decodes the input image data, and outputs the decoded image data to the display unit 107, to play back the moving image. Then, the processing ends. The image data of the scene prior to the scene selected in step S703 to be output to the image processing unit 105 may be image data of a part of an end portion of the scene prior to the scene selected in step S703, or the entire image data of the scene prior to the scene selected in step S703. In some cases, the scene may be a long moving image. In such cases, the part of the end portion is preferably displayed to smoothly perform the shooting processing thereafter. Similarly, the image data of the scene subsequent to the scene selected in step S703 to be output to the image processing unit 105 may be image data of a part of a top portion of the scene subsequent to the scene selected in step S703, or the entire image data of the scene subsequent to the scene selected in step S703. In some cases, the scene may be a long moving image. In such cases, the part of the top portion is preferably displayed to smoothly perform the shooting processing thereafter.

In step S805, the microcomputer 101 determines whether there is a scene subsequent to the scene selected in step S703, based on the scenario data stored in the RAM 103. The processing proceeds to step S806 when there is a subsequent scene, and proceeds to step S807 when there is no subsequent scene.

In step S806, the microcomputer 101 controls the storage medium 106 to output the image data of the scene selected in step S703 and the image data of the scene subsequent to the scene selected in step S703, to the image processing unit 105. The image processing unit 105 decodes the input image data and outputs the decoded image data to the display unit 107, to play back the moving image. Then, the processing ends. As described above, the image data of the scene subsequent to the scene selected in step S703 to be output to the image processing unit 105 may be image data of a part of a top portion of the scene subsequent to the scene selected in step S703, or the entire image data of the scene subsequent to the scene selected in step S703.

In step S807, the microcomputer 101 controls the storage medium 106 to output the image data of the scene selected in step S703 to the image processing unit 105. The image processing unit 105 decodes the input image data and outputs the decoded image data to the display unit 107, to play back the moving image. Then, the processing ends and returns to step S707.

Here, a specific example of the processing in S706 will be described using the scenario data illustrated in FIG. 3. It is assumed that the state of the scenario data in the storage medium 106 is as illustrated in FIG. 3 and the last captured scene is the scene "receiving birthday present". Under such a condition, when the scene "receiving birthday present" is selected in step S703, there is a captured scene ("entry of birthday boy/girl") prior to the scene "receiving birthday present", and thus the scene "entry of birthday boy/girl" (the image number 3) and the scene "receiving birthday present" (the image number 2) are played back. When another scene, for example, the scene "entry of birthday boy/girl" is selected, only the scene "entry of birthday boy/girl" is played back.

Further, it is assumed that the state of the scenario data in the storage medium 106 is as illustrated in FIG. 3 and the last captured scene is the scene "entry of birthday boy/girl". Under such a condition, when the scene "entry of birthday boy/girl" is selected in step S703, there is a captured scene ("receiving birthday present") subsequent to the scene "entry of birthday boy/girl", and thus the scene "entry of birthday boy/girl" (the image number 3) and the scene "receiving birthday present" (the image number 2) are played back. When another scene, for example, the scene "receiving birthday present" is selected, only the scene "receiving birthday present" is played back.

When the scenario data in the storage medium 106 is in the state illustrated in FIG. 3 and the scene "candle blowing" is selected in step S703 after the scene "candle blowing" is captured, the prior scene "receiving birthday present" and the subsequent scene "taking birthday photo" of the scene "candle blowing" are played back. For example, when the scene "receiving birthday present" is selected, only the scene "receiving birthday present" is played back.

In step S707, the microcomputer 101 controls the image processing unit 105 to generate display data for asking a question, "Do you want to recapture the scene selected in step S703?" and output an instruction screen for issuing an instruction for recapturing to the display unit 107. The user touches the touch sensor 110 while viewing the display unit 107. The touch sensor 110 outputs information indicating which area is touched, to the microcomputer 101. Based on the output information, the microcomputer 101 compares the displayed area on the display unit 107 with the touched area on the touch sensor 110, to determine whether the user has selected the recapturing. Whether to recapture the scene can be selected by a remote control operation through the remote control receiving unit 109. Here, the remote control receiving unit 109 receives a remote control code from a remote controller, and outputs remote control information to the microcomputer 101. The microcomputer 101 determines whether the recapturing is selected, based on the remote control code input from the remote control receiving unit 109.

When the last captured scene is the scene "receiving birthday present", and the scene "receiving birthday present" is selected in step S703, a UI illustrated in FIG. 9 is displayed on the display unit 107. An instruction screen for determining whether to recapture the scene selected in step S703, as illustrated in 901, a representative scene of the scene selected in step S703, as illustrated in 902, and icons for selecting whether to recapture the scene selected in step S703, as illustrated in 903, are displayed. Then, the processing proceeds to step S708.

In step S708, the microcomputer 101 determines whether the recapturing of the scene is selected in step S707. The processing proceeds to step S709 when the recapturing of the scene is selected (YES in step S708). The processing returns to step S703 when the scene is determined not to be recaptured (NO in step S708).

In step S709, the imaging apparatus 111 shifts to the scenario shooting mode for the scene selected in step S703. For example, when the scene "receiving birthday present" is selected in step S703, the imaging apparatus 111 enters the shooting mode in which the scene "receiving birthday present" is associated with the image to be captured. How the association is made has been described in step S202.

The present invention has been described above based on the exemplary embodiments. However, the present invention is not limited to these exemplary embodiments, and includes various embodiments within the scope of the present invention. Parts of the exemplary embodiments described above may be combined as appropriate.

Embodiments of the present invention can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2013-125725 filed Jun. 14, 2013, which is hereby incorporated by reference herein in its entirety.

What is claimed is:

1. An imaging apparatus for capturing a moving image, the imaging apparatus comprising:
a storage unit configured to store scenario data for forming one scenario with a plurality of scenes and for managing, in association with one of the plurality of scenes in the scenario, a moving image captured by an imaging unit;
a display control unit configured to perform control so that a list of pieces of information representing the plurality of scenes is displayed on a display unit by using the scenario data;
a selection unit configured to select one of the plurality of scenes from the list displayed on the display unit; and
a control unit configured to perform control so that when the scene selected by the selection unit is a captured scene, the selected captured scene is played back, and when the scene selected by the selection unit is an uncaptured scene, the imaging apparatus enters a shooting standby state for capturing the selected uncaptured scene,
wherein when the captured scene is selected by the selection unit, the display control unit is configured to display an instruction screen for issuing an instruction for recapturing the selected captured scene, and
wherein when the instruction for recapturing the selected captured scene is issued, the control unit is configured to perform control so that the imaging apparatus shifts to a standby state for recapturing the selected captured scene.

2. The imaging apparatus according to claim 1 further comprising a recording unit configured to record, in a memory, moving image data obtained by capturing an image after the uncaptured scene is selected by the selection unit and the imaging apparatus has entered the shooting standby state for capturing the uncaptured scene, the moving image data being recorded in association with the selected scene.

3. The imaging apparatus according to claim 1, wherein, in the list, the captured scene and the uncaptured scene are displayed in an identifiable manner.

4. The imaging apparatus according to claim 1, wherein the display control unit is configured to display, in the list, at least one of an explanation, an illustration, and a photograph as information representing the uncaptured scene, and a representative image corresponding to the captured moving image as information representing the captured scene.

5. The imaging apparatus according to claim 1, wherein when a last captured scene is played back, at least a part of a scene prior or subsequent to the last captured scene is also played back.

6. The imaging apparatus according to claim 1,
wherein the control unit is configured to play back, when the captured scene is selected by the selection unit and there is an uncaptured scene subsequent to the selected captured scene, an end portion of the selected captured scene for a predetermined time period, and
wherein the control unit is configured to play back, when the captured scene is selected by the selection unit and there is an uncaptured scene prior to the selected captured scene, a top portion of the selected captured scene for a predetermined time period.

7. The imaging apparatus according to claim 6 further comprising a specifying unit configured to specify the predetermined time period.

8. A method for controlling an imaging apparatus including a storage unit configured to store scenario data for forming one scenario with a plurality of scenes and for managing a captured moving image in association with one of the plurality of scenes in the scenario, the method comprising:
performing control so that a list of pieces of information representing the plurality of scenes is displayed on a display unit by using the scenario data;
selecting one of the plurality of scenes from the list displayed on the display unit; and
performing control so that when the selected scene is a captured scene, the selected captured scene is played back, and when the selected scene is an uncaptured scene, the imaging apparatus enters a shooting standby state for capturing the selected uncaptured scene,
wherein when the captured scene is selected, performing control to display an instruction screen for issuing an instruction for recapturing the selected captured scene, and
wherein when the instruction for recapturing the selected captured scene is issued, performing control so that the imaging apparatus shifts to a standby state for recapturing the selected captured scene.

9. The method according to claim 8 further comprising recording, in a memory, moving image data obtained by capturing an image after the uncaptured scene is selected, and the imaging apparatus has entered the shooting standby state for capturing the uncaptured scene, the moving image data being recorded in association with the selected scene.

10. The method according to claim 8, wherein, in the list, the captured scene and the uncaptured scene are displayed in an identifiable manner.

11. The method according to claim 8, further comprising displaying, in the list, at least one of an explanation, an illustration, and a photograph as information representing the uncaptured scene, and a representative image corresponding to the captured moving image as information representing the captured scene.

12. The method according to claim 8, wherein when a last captured scene is played back, at least a part of a scene prior or subsequent to the last captured scene is also played back.

13. The method according to claim 8,
performing control to play back, when the captured scene is selected and there is an uncaptured scene subsequent to the selected captured scene, an end portion of the selected captured scene for a predetermined time period, and performing control to play back, when the captured scene is selected and there is an uncaptured scene prior to the selected captured scene, a top portion of the selected captured scene for a predetermined time period.

14. The method according to claim 13 further comprising specifying the predetermined time period.

15. A non-transitory computer-readable storage medium that stores computer executable instructions for causing a computer to implement a method for controlling an imaging apparatus including a storage unit configured to store scenario data for forming one scenario with a plurality of scenes and for managing a captured moving image in association with one of the plurality of scenes in the scenario, the method comprising:

performing control so that a list of pieces of information representing the plurality of scenes is displayed on a display unit by using the scenario data;

selecting one of the plurality of scenes from the list displayed on the display unit; and performing control so that when the selected scene is a captured scene, the selected captured scene is played back, and when the selected scene is an uncaptured scene, the imaging apparatus enters a shooting standby state for capturing the selected uncaptured scene, wherein when the captured scene is selected, performing control to display an instruction screen for issuing an instruction for recapturing the selected captured scene, and wherein when the instruction for recapturing the selected captured scene is issued, performing control so that the imaging apparatus shifts to a standby state for recapturing the selected captured scene.

16. The non-transitory computer-readable storage medium according to claim 15 further comprising recording, in a memory, moving image data obtained by capturing an image after the uncaptured scene is selected, and the imaging apparatus has entered the shooting standby state for capturing the uncaptured scene, the moving image data being recorded in association with the selected scene.

17. The non-transitory computer-readable storage medium according to claim 15, wherein, in the list, the captured scene and the uncaptured scene are displayed in an identifiable manner.

18. The non-transitory computer-readable storage medium according to claim 15, further comprising displaying, in the list, at least one of an explanation, an illustration, and a photograph as information representing the uncaptured scene, and a representative image corresponding to the captured moving image as information representing the captured scene.

19. The non-transitory computer-readable storage medium according to claim 15, wherein when a last captured scene is played back, at least a part of a scene prior or subsequent to the last captured scene is also played back.

20. The non-transitory computer-readable storage medium according to claim 15, performing control to play back, when the captured scene is selected and there is an uncaptured scene subsequent to the selected captured scene, an end portion of the selected captured scene for a predetermined time period, and performing control to play back, when the captured scene is selected and there is an uncaptured scene prior to the selected captured scene, a top portion of the selected captured scene for a predetermined time period.

21. The non-transitory computer-readable storage medium according to claim 20 further comprising specifying the predetermined time period.

* * * * *